US012739186B2

(12) United States Patent
Gandhi et al.

(10) Patent No.: US 12,739,186 B2
(45) Date of Patent: Sep. 15, 2026

(54) ECMP-AWARE TWAMP PERFORMANCE MEASUREMENTS

(71) Applicant: Cisco Technology, Inc., San Jose, CA (US)

(72) Inventors: Rakesh Gandhi, Stittsville (CA); Clarence Filsfils, Brussels (BE); Sonia Ben Ayed, Vanves (FR); Ahmed Mohamed Ahmed Abdelsalam, L'Aquila (IT); Pablo Camarillo Garvia, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 369 days.

(21) Appl. No.: 18/371,848

(22) Filed: Sep. 22, 2023

(65) Prior Publication Data

US 2024/0430188 A1 Dec. 26, 2024

Related U.S. Application Data

(60) Provisional application No. 63/522,238, filed on Jun. 21, 2023.

(51) Int. Cl.

*H04L 43/10* (2022.01)
*H04L 43/04* (2022.01)
*H04L 43/08* (2022.01)
*H04L 45/24* (2022.01)

(52) U.S. Cl.

CPC .............. *H04L 43/10* (2013.01); *H04L 43/04* (2013.01); *H04L 43/08* (2013.01); *H04L 45/24* (2013.01)

(58) Field of Classification Search

CPC ......... H04L 43/10; H04L 43/04; H04L 43/08; H04L 45/24; H04L 43/0852; H04L 45/70

See application file for complete search history.

(56) References Cited

U.S. PATENT DOCUMENTS 11,552,879 B1 1/2023 Sivabalan et al.
2003/0115321 A1 6/2003 Edmison et al.
2015/0117203 A1* 4/2015 Filsfils .................... H04L 47/20 370/235
2017/0019323 A1 1/2017 Allan et al.
2017/0324622 A1* 11/2017 Ubaldi .................... H04L 41/12
2019/0342219 A1* 11/2019 Liu ......................... H04L 41/40

(Continued)

FOREIGN PATENT DOCUMENTS

CN 114629843 12/2020

*Primary Examiner* — Schquita D Goodwin

(74) *Attorney, Agent, or Firm* — Lee & Hayes, P.C.

(57) ABSTRACT

Techniques for determine latency, loss, and liveness performance metrics associated with ECMP routes. The techniques may include determining that a TWAMP probe is to be sent from a first node to a second node along an equal-cost multipath ECMP route. In some examples, the first node may generate a packet for sending the TWAMP probe to the second node. The packet may include information specifying a forward path and reverse path to be traversed by the packet. In examples, the first node may send the packet to the second node along the ECMP route and subsequently receive the packet including telemetry data associated with the second node and a midpoint node of the ECMP route. Based at least in part on the telemetry data, the first node may determine a metric indicative of a performance measurement associated with the ECMP route.

20 Claims, 9 Drawing Sheets

(56) References Cited

U.S. PATENT DOCUMENTS

| | | | | |
|---|---|---|---|---|
| 2020/0084147 | A1* | 3/2020 | Gandhi | H04L 43/20 |
| 2020/0296012 | A1* | 9/2020 | Paruchuri | H04L 43/50 |
| 2022/0173992 | A1 | 6/2022 | Filsfils et al. | |
| 2023/0047613 | A1* | 2/2023 | Frankel | H04B 10/27 |
| 2023/0145097 | A1* | 5/2023 | Kiran | H04L 41/147<br>370/235 |
| 2023/0146226 | A1* | 5/2023 | Sivabalan | H04L 45/34<br>370/254 |
| 2023/0231798 | A1* | 7/2023 | Chunduri | H04L 45/22<br>370/389 |
| 2023/0254246 | A1 | 8/2023 | Filsfils et al. | |

* cited by examiner

Figure 5:
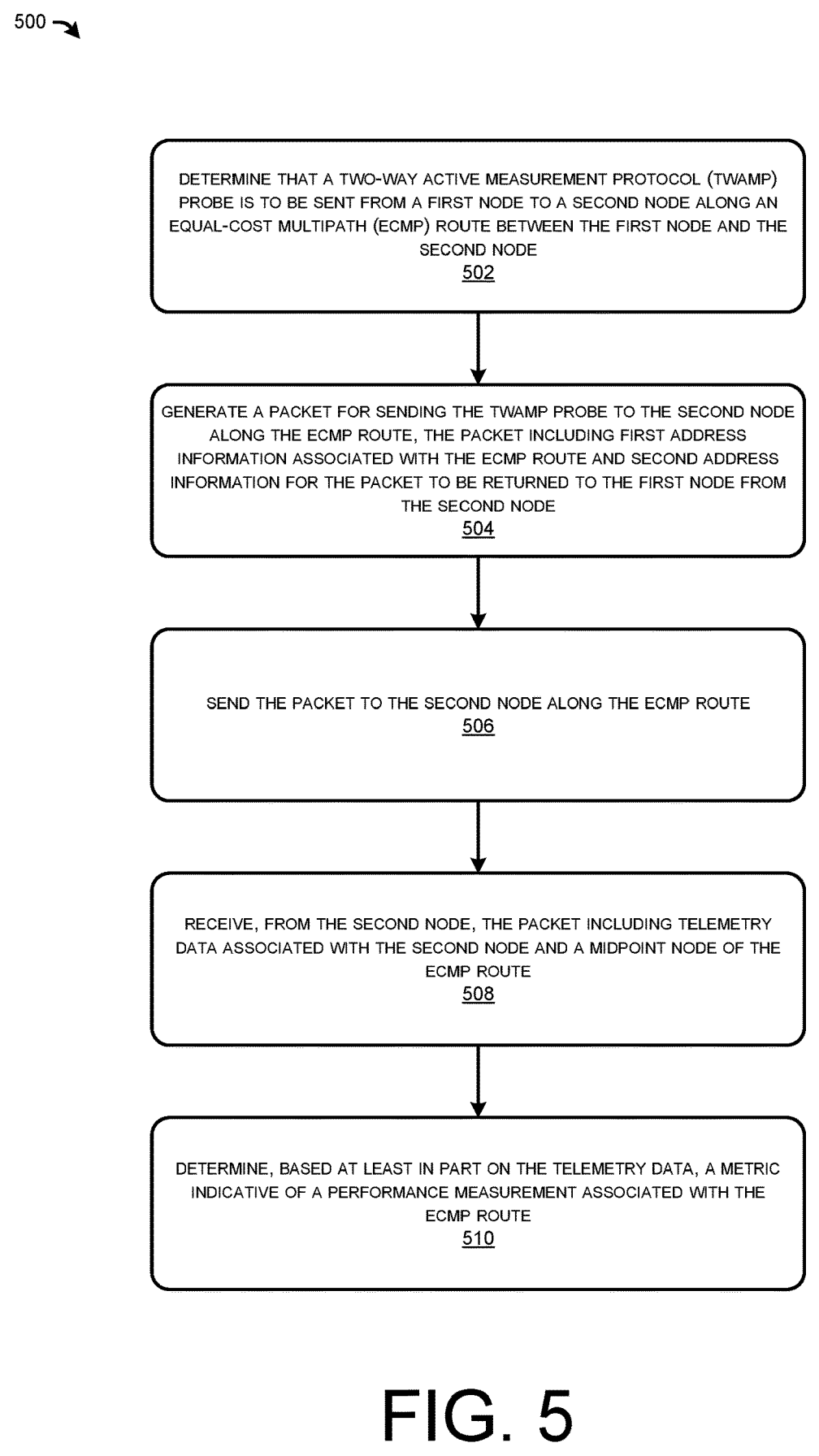

500

DETERMINE THAT A TWO-WAY ACTIVE MEASUREMENT PROTOCOL (TWAMP) PROBE IS TO BE SENT FROM A FIRST NODE TO A SECOND NODE ALONG AN EQUAL-COST MULTIPATH (ECMP) ROUTE BETWEEN THE FIRST NODE AND THE SECOND NODE
502

GENERATE A PACKET FOR SENDING THE TWAMP PROBE TO THE SECOND NODE ALONG THE ECMP ROUTE, THE PACKET INCLUDING FIRST ADDRESS INFORMATION ASSOCIATED WITH THE ECMP ROUTE AND SECOND ADDRESS INFORMATION FOR THE PACKET TO BE RETURNED TO THE FIRST NODE FROM THE SECOND NODE
504

SEND THE PACKET TO THE SECOND NODE ALONG THE ECMP ROUTE
506

RECEIVE, FROM THE SECOND NODE, THE PACKET INCLUDING TELEMETRY DATA ASSOCIATED WITH THE SECOND NODE AND A MIDPOINT NODE OF THE ECMP ROUTE
508

DETERMINE, BASED AT LEAST IN PART ON THE TELEMETRY DATA, A METRIC INDICATIVE OF A PERFORMANCE MEASUREMENT ASSOCIATED WITH THE ECMP ROUTE
510

ECMP-AWARE TWAMP PERFORMANCE MEASUREMENTS

RELATED CASES

This application claims priority to U.S. Provisional Application No. 63/522,238 filed on Jun. 21, 2023, the entire contents of which is incorporated herein by reference in its entirety and for all purposes.

TECHNICAL FIELD

The present disclosure relates generally to techniques for, among other things, adding Equal-Cost Multipath (ECMP) awareness to Two-Way Active Measurement Protocol (TWAMP) performance measurements for determining latency, loss, and liveness associated with ECMP routes, both per-hop and end-to-end.

BACKGROUND

In 5G networks, service providers are planning to deliver Ultra-Reliable Low-Latency Communication (URLLC) services, and traffic flows through 5G network paths are expected to satisfy certain constraints as defined in customer Service Level Agreements (SLAs). For example, services such as telemedicine, online gaming, autonomous cars, stock market trading, mission critical applications, and the like have strict end-to-end constraints. As such, determining constraint violations is an important aspect of 5G technology. However, current path tracing techniques are inadequate for monitoring certain performance metrics.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 is a flow diagram illustrating an example method associated with the techniques disclosed herein.

FIG. 9 is a computer architecture diagram showing an illustrative computer hardware architecture for implementing a computing device that can be utilized to implement aspects of the various technologies presented herein.

DESCRIPTION OF EXAMPLE EMBODIMENTS

Overview

Figure 1:
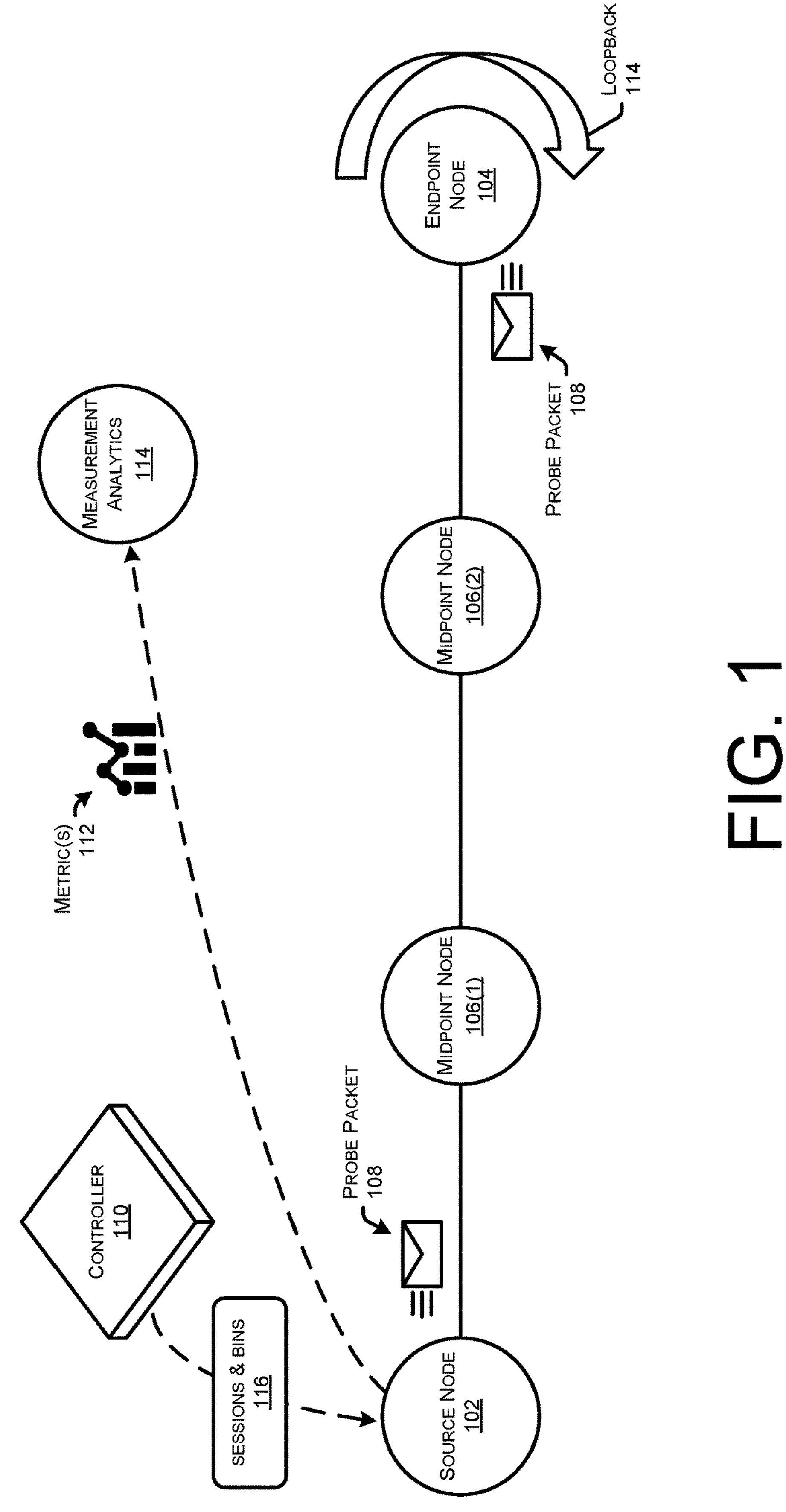
FIG. 1 is a system diagram illustrating an example architecture which may utilize various aspects of the techniques disclosed herein.

This application is directed to techniques for adding Equal-Cost Multipath (ECMP) awareness to Two-Way Active Measurement Protocol (TWAMP) or Simple TWAMP (STAMP) based performance measurements for determining latency, loss, and liveness associated with ECMP routes. By way of example, and not limitation, the techniques disclosed herein may include determining that a TWAMP probe (or test packet) is to be sent to a second node along an equal-cost multipath (ECMP) route between a first node and the second node. The techniques may also include generating a packet for sending the TWAMP probe to the second node along the ECMP route, the packet including first address information associated with the ECMP route and second address information for the packet to be returned to the first node from the second node. In examples, the first node may send the packet to the second node along the ECMP route and, thereafter, receive, from the second node, the packet including telemetry data associated with the second node and a midpoint node of the ECMP route. In some instances, the second node may modify a hop-by-hop option—of the packet to refrain other nodes along the return path from adding telemetry data to the packet. In some examples, the first node may determine, based at least in part on the telemetry data, a metric indicative of a performance measurement associated with the ECMP route.

Additionally, the techniques described herein may be performed as a method and/or by a system having non-transitory computer-readable media storing computer-executable instructions that, when executed by one or more processors, performs the techniques described above and herein.

EXAMPLE EMBODIMENTS

As noted above, determining constraint violations is an important aspect of 5G technology as many 5G customers and their services have strict service level agreement (SLA) constraints. However, current techniques are inadequate for measuring certain performance metrics. Thus, there is a need for path tracing techniques that are capable of monitoring the performance (e.g., latency, loss, liveness, etc.) of customer traffic in both service provider and data center networks to be able to provide guaranteed service, as well as to detect and isolate network problems quickly. In addition, there is an interest in collecting performance data from the network for network-wide analytics to enable Artificial Intelligence (AI) and machine learning (ML) to improve network efficiency and prevent network service degradation and outages (e.g., via predictive networking).

This application describes techniques for generating and utilizing TWAMP loopback probes along with Path Tracing (PT) Internet Protocol version 6 (IPv6) hop-by-hop (HBH) option to determine latency, loss, and liveness (3 L) performance metrics. The techniques disclosed herein enable active measurement for combined latency, loss and liveness detection (3 L) using loopback probes generated at the source in hardware and consumed at the sink on the same (ingress provider edge (PE)) node also in hardware. For instance, TWAMP probe packets may be generated by a source node with IPv6 HBH option that will be used to record Midpoint Compressed Data (MCD) (e.g., 8-bit timestamp, 12-bit interface ID, and 4-bit interface load in 3 bytes per hop). In examples, the TWAMP probe packets may carry a full, 64-bit transmit timestamp that may be used along with short, 8-bit timestamps from IPv6 HBH option (e.g., recorded by midpoint nodes as MCD) to compute per-hop delay. In some examples, endpoints may be configured to update the IPv6 PT HBH option-type to IPv6 "PT-SKIP" option-type (either of IPv6 destination option or IPv6 HBH option type) for the egress PE to avoid PT midpoint data recording on the return path. The TWAMP return packet may be ingested by the sink in hardware on the same ingress PE node that can process high PPS in hardware.

TWAMP is a protocol used for measuring network performance and quality between two endpoints in a network. It is often used to assess the performance of network paths, diagnose network issues, and ensure Quality of Service (QoS) for various network applications. A "TWAMP loopback probe" refers to a specific type of TWAMP test or measurement where the probe or test traffic is looped back to the sender without sending the packet to the control-plane from the forwarding plane on the endpoint for TWAMP processing. The sink functionality of the probe may also be implemented on the source node in loopback mode. This loopback testing is useful for several purposes, such as testing endpoint readiness, assessing local network performance, measuring round-trip delay, measuring round-trip loss, endpoint node liveness, and the like. The loopback probe to the endpoint node may convey to the sender (source) that the endpoint node is alive. The liveness state failure for example may be used at the source node to steer traffic away from the failed ECMP route to a working ECMP route. The ECMP route may be a circuit style Segment Routing traffic engineering policy or IGP flexible algorithm path.

By way of example, and not limitation, a method according to the techniques disclosed herein may include determining, by a first node (e.g., ingress PE) of a network, that a Two-Way Active Measurement Protocol (TWAMP) probe is to be sent to a second node (e.g., endpoint) along an equal-cost multipath (ECMP) route between the first node and the second node. In examples, the ECMP route may be one of multiple ECMP routes through the network between the first node and the second node. In examples, the purpose of sending the TWAMP probe packet may be to monitor latency, loss, and liveness associated with the ECMP route, as well as path tracing the ECMP route. For instance, the TWAMP probe may be generated along with path tracing (PT) IPv6 HBH option to record midpoint compressed data from intermediate nodes between the first node and the second node.

In some examples, the method may include generating a packet for sending the TWAMP probe to the second node along the ECMP route, the packet including first address information associated with the ECMP route and second address information for the packet to be returned to the first node from the second node. In some examples, the format of the packet may be the same format as customer traffic traversing the ECMP route. In such instances, the packet may include an indicator for the second node to distinguish the packet from the customer traffic and determine the packet contains a TWAMP probe with PT.

In some examples, the method may include sending the packet to the second node along the ECMP route. As such, the second node may receive the packet via the ECMP route. The ECMP path may contain bundled interface with member links where each member link is an ECMP path, and probe packet is sent over a member link of the bundle interface. In some examples, the second node may be configured to determine that the packet is a probe packet that is to be forwarded back to the first node. For instance, the second node may determine the packet is the probe packet and/or that the packet is to be forwarded back to the first node based at least in part on an indication included in the packet.

In some examples, the second node may modify a hop-by-hop option type of the packet to refrain from collecting telemetry data along a return path to the source node. For instance, when the packet is received at the second node, the packet may include telemetry data appended or recorded to the packet by the one or more midpoint nodes along the ECMP route. As such, the second node may modify the hop-by-hop option so that midpoint nodes along the return path do not append additional telemetry data in the packet. For instance, the second node may change the hop-by-hop option type from "PT" for path tracing to "PT-SKIP" so that no more telemetry data is collected. In some examples, the telemetry data may be carried within a hop-by-hop (HBH) field of the packet. In examples, the telemetry data may be midpoint compressed data, which may include a short timestamp, short interface identifier, interface load, etc. associated with the one or more midpoint nodes. In some other examples, telemetry data may include node identifier, queue depth, packet counters, etc.

In some examples, the second node may append its own telemetry data to the packet. That is, the second node may add telemetry data to the hop-by-hop field of the packet. This telemetry data added by the second node may include timestamp data, interface identifier data, interface load data, midpoint compressed data, and/or the like for determining combined latency, loss, and liveness. For instance, the telemetry data may include a portion of a timestamp (as short timestamp), an interface identifier (as short interface identifier), and an interface load (as short load value, as exponential average of traffic rate over an interval represented) associated with the second node.

In some examples, the second node may send the packet back to the first node and the first node may subsequently receive the packet. The received packet may, in some examples, include telemetry data associated with the second node and one or more midpoint nodes of the ECMP route. In some examples, the telemetry data may be included in a hop-by-hop field of the packet. In some examples, the telemetry data may include a portion of a timestamp (e.g., short, 8-bit timestamp), an interface identifier (e.g., short, 12-bit interface identifier), and an interface load (e.g., 4-bit logarithmic load) associated with each one of the second node and the one or more midpoint nodes.

In some examples, the method may also include determining, based at least in part on the telemetry data, a metric indicative of a performance measurement associated with the ECMP route. In some examples, the performance measurement may include a latency, a loss, or a liveness associated with the ECMP route. In some examples, the ECMP route may be a first ECMP route and the metric may be determined based at least in part on additional telemetry data received from sending a second TWAMP probe along a second ECMP route. In such instances, the metric may be indicative of a difference in performance between the first ECMP route and the second ECMP route. For instance, the metric may be a histogram associated with the first ECMP route, the second ECMP route, and other ECMP routes. In some examples, the histogram may be a latency histogram. In some examples, the metric may be a packet loss metric, an availability metric, a combined latency, loss, and liveness (3 L) metric, etc. The latency metrics may be computed as minimum latency, maximum latency, average latency and jitter (variance), etc. for each ECMP route or across ECMP routes.

In some examples, the method may also include sending the metric to a measurement analytics system associated with the network. For instance, the histogram and any other metrics indicative of the performance of the ECMP route relative to other ECMP route(s) may be sent to the measurement analytics system. A histogram for latency may be computed using the latency values collected by sending probes across all ECMP routes. The number of bins and counters for the histogram is influenced by the number of ECMP routes measured by the probes. The packet loss metric may be aggregated packet loss across ECMP routes or for each individual ECMP route.

In some examples, a controller may communicate with the measurement analytics (MA) system and may determine network decisions and/or optimizations based on the metrics. The MA system may have a view of the complete network topology and all ECMP routes between any two nodes in the network. For example, MA system may highlight the mismatch of ECMP paths discovered by probing and expected ECMP paths found in network topology database. In another example, MA system may highlight the ECMP path with unexpected latency value or latency value that violates certain threshold value. MA system may further indicate the per-hop latency on an ECMP path with unexpected latency causing the violation for the ECMP path. In another example, MA system may correlate several ECMP paths with packet loss or higher latency to further troubleshoot the issue in the network by finding a common element common element along the ECMP paths. The latency histogram with aggregated latencies across ECMPs may help indicate that there is an ECMP path with latency issue by checking the outliers. Various performance measurement metrics may be used to indicate the quality of an ECMP route and for service level assurance purposes.

According to the techniques disclosed herein, several advantages in computer-related technology may be realized. For instance, the techniques disclosed herein add ECMP awareness to End-to-End TWAMP performance measurements. Additionally, the techniques disclosed herein enable VRF Awareness for these measurements. Because the probe packets can be injected in VRF and received/processed in the VRF, the disclosed techniques allow to measure the complete service path, not just the underlay. The service paths can be for a layer-3 (L3) service or layer-2 (L2) service. In some examples, the probe packet may carry the same L2 and L3 service Segment Routing SID as customer data traffic. The VRF may be specifically created for measurement purposes to transmit TWAMP probe packets. The disclosed techniques also allow for the detection of constraint violations in 5G networks. Other advantages in computer-related technology will be readily apparent to those having ordinary skills in art.

As discussed herein, in some examples an IPv6 Hop-By-Hop (HBH) option may be carried in TWAMP probes to record HBH Midpoint Compressed Data (MCD), including short (8-bit) timestamps, 4-bit interface load, and 12-bit interface ID to measure per-hop latency and loss and to trace packet forwarding paths in the forward direction. In some examples, the IPv6 HBH option type may be modified on the endpoint (responder or reflector) node to "PT-SKIP" (that may be with IPv6 HBH option type or IPv6 destination option type) to avoid recording PT HBH MCD on the return path that can possibly overwrite previously collected MCD from the forward direction. In some examples, due to the limitation in hardware to read and write deep into the packet, the HBH option size carried is just large enough to record the forward direction MCDs. In some examples, the techniques disclosed herein may include generating TWAMP probe packets (using the same encapsulation as L3/L2 customer data packets) with different ECMP hash to discover and monitor ECMP paths in a measurement VRF. For instance, generating a random IPv6 flow-label in TWAMP packet using local PTP Timestamp, a random IPv6 flow-label in packet by sweeping range of UDP source ports for IPv4, and a random IPv6 flow-label in packet for MAC header for L2 by sweeping VLAN ID may be used to discover and monitor ECMP paths in a measurement VRF. A node may select one of the ECMP outgoing paths by using hash of source address, destination address, Next-Header, Flow Label and other fields in the packet. In some examples, the Next-Header (NH) field from the IPv6 header may be removed from ECMP hash computation to enable probe packets to follow customer data packets as that may carry different value in the NH field than the probe packets. In some examples, a TWAMP packet may carry a full 64-bit PTP timestamp which is used along with short (8-bit) PTP timestamps (which is short portion of the 64-bit timestamp) from MCD in HBH option to reconstruct the full timestamp for the short timestamp value and compute hop-by-hop latency. For SR-MPLS and MPLS data plane, MPLS Network Action (MNA) Sub-Stack (in label stack) along with Pre-allocated Post-Stack Network Action with Ancillary data (PSD) (after the bottom of the label stack) may be carried to record the HBH MCD in TWAMP probes. In examples, measurement analytics may be computed in hardware using the unique hash of interface IDs from recorded HBH option representing an ECMP path with its associated latency histogram bins distribution, packet loss metric and liveness state. In other words, when hash is computed for different probe packets received with interface IDs in HBH option at source, unique hash value identifies a unique ECMP path between source and the endpoint. As an example, measurement analytics may be streamed to measurement analytics system with this hash value.

In some examples, probe packets may be generated that have the same format as customer packets. In the Segment Routing context, packets may have the same underlay SID List and the same Service SID. In some instances, probe packets may be injected in VRF and received/processed in VRF. The VRF may be used to carry customer traffic or for dedicated measurement VRF for TWAMP probe packets. This allows us to measure the complete service path not only the underlay. In some examples, a marker may be added to the probe packets such that the remote node (e.g., endpoint node) receiving the probes can differentiate between probes and customer packets.

Certain implementations and additional embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a system diagram illustrating an example architecture 100 which may utilize various aspects of the techniques disclosed herein. The architecture 100 includes a source node 102, an endpoint node 104, and midpoint nodes 106(1) and 106(2). In the examples described above, the source node 102 may correspond with the first node and the endpoint node 104 may correspond with the second node. In examples, the source node 102, the endpoint node 104, and the midpoint nodes 106(1) and 106(2) may be part of an ECMP route through a network.

In examples, the source node 102 may send a probe packet 108 to the endpoint node 104 along the ECMP route, and the endpoint node 104 may return the probe packet 108 to the source node 102 (e.g., via the ECMP route or another route). In examples, the probe packet 108 may contain a TWAMP probe and a PT IPv6 HBH option for recording telemetry data associated with the nodes along the ECMP route (e.g., the midpoint nodes 106(1) and 106(2) and the endpoint node 104).

In some examples, the source node 102 (e.g., ingress PE node) may include a hardware offload engine that generates the probe packet 108 (e.g., TWAMP probe packets with IPv6 HBH option). In examples, the source node 102 may add a 64-bit timestamp in the TWAMP probe. In examples, the source node may also update midpoint compressed data in the IPv6 HBH option with its own interface ID, interface load, and short timestamp on egress. The source node 102 may also include a network processing unit (NPU) that is configured to add any necessary encapsulation to the probe packet, such as IPv6 and/or SRH, in the same way it would for the customer data packets.

In some examples, the midpoint nodes 106(1) and 106(2) (hereinafter referred to collectively as "midpoint nodes 106") may be configured to update the probe packet 108 with midpoint compressed data. In examples, the midpoint compressed data may be 3-bytes total and include an interface ID, a short timestamp, and interface load). In some examples, the midpoint nodes 106 may embed the midpoint compressed data in the probe packet 108 within the pre-allocated IPv6 HBH option of the TWAMP probe packet.

In some examples, the IPv6 HBH PT option may be added to TWAMP probes to record PT data on each hop, the goal being to record the PT data in the forward path direction only and not record on the reverse path. When a TWAMP packet reaches the endpoint node 104, the HBH IPv6 PT option type may be changed by the endpoint node 104 to PT-SKIP option type or in another example change the IPv6 HBH option type to IPv6 destination option type. As such, when a midpoint node on the reverse path detects PT-SKIP IPv6 option, the midpoint node does not append midpoint compressed data in the IPv6 HBH option or IPv6 destination option.

In examples, the endpoint node 104 may be configured to update the midpoint compressed data in the HBH option with its own interface ID, short timestamp, and interface load. Additionally, in some examples, the endpoint node 104 may update the IPv6 PT HBH option type, as noted above, so midpoint nodes on the reverse path do not update the midpoint compressed data. In examples, the endpoint (TWAMP reflector) node 104 may not perform any TWAMP packet processing. In some other examples, the endpoint node may perform TWAMP packet processing and update full 64-bit timestamp in the packet, in addition to with or without updating the HBH option in the packet. Although, in some examples, the endpoint node 104 may perform SRv6 decapsulation in the received packet, and SRv6 encapsulation forwarding the packet back to the source node 102. In some other examples, the endpoint node 104 may perform SR-MPLS decapsulation in the received packet, and SR-MPLS encapsulation forwarding the packet back to the source node 102. In some other examples, the endpoint node 104 may decapsulate the outer IPv6 header in the received packet and forward the packet back to the source node 102 using the inner IPv6 header. In some other examples, the endpoint node 104 may decapsulate the outer header and forward the packet back to the source node 102 using the inner IPv4 header. In some examples, the endpoint node 104 may have no requirement on precision time protocol clock sync with querier (source) and/or no measurement analytics requirement at all, as there are no histogram bins. In examples, after the endpoint node 104 is finished performing its respective functionality, it may send or otherwise cause the probe packet 108 to loopback 114 to the source node 102.

In some examples, the architecture 100 may send the probe packets 108 as described herein (e.g., TWAMP loopback probes including PT IPv6 HBH) to monitor liveness across ECMP routes. In some examples, liveness may monitor consecutive missed packet count across flow labels. In some examples, the liveness intervals may be configured so that the tx-interval is 3.3 milliseconds (msec), and a sweeping flow-label is used such that one ECMP to another ECMP affects the next packet arrival time. For example, one ECMP path (ECMP1) may have a round-trip latency of 3 msec and another ECMP path (ECMP2) that goes around the world may have a round-trip latency of 50 msec. In such an example, a first packet may come back with a 3 msec round-trip delay on ECMP1. A second packet comes back in 50 msec round-trip delay on ECMP2 that has higher end to end latency. In such a case, liveness is declared down if consecutive N packets are lost (where N is user configured) only after waiting for N*50 msec in this example when sweeping flow labels across ECMPs In some examples, the probe packet 108 may be ingested by the sink on the source node 102 in hardware and a histogram bin may be populated using the end-to-end round-trip latency value as well as using the per-hop latency values from the probe packet 108. In some examples, a histogram may be generated with latency values between two PE nodes (e.g., source node 102 and endpoint node 104) across all ECMP paths as opposed to for each ECMP path. However, in some instances techniques may be used to increase the histogram counters to improve the resolutions of the latency bins when abnormality is to be investigated. In some examples, the source node 102 may represent a top of rack (ToR) switch and the endpoint node may represent a server in a data center.

In some examples, the source node 102 may determine that a TWAMP probe is to be sent to the endpoint node 104 along an ECMP route between the source node 102 and the endpoint node 104. In examples, the ECMP route may be one of multiple ECMP routes through the network between the source node 102 and the endpoint node 104. In examples, the purpose of sending the TWAMP probe may be to monitor latency, loss, and liveness associated with the ECMP route, as well as path tracing the ECMP route. For instance, the TWAMP probe may be generated along with path tracing (PT) IPv6 HBH option to record midpoint compressed data from the midpoint nodes 106 between the source node 102 and the endpoint node 104.

In some examples, the source node 102 may generate the probe packet 108 for sending the TWAMP probe to the endpoint node 104 along the ECMP route. In some examples, the probe packet 108 may include first address information associated with the ECMP route and second address information for the packet to be returned to the source node 102 from the endpoint node 104. In some examples, the format of the probe packet 108 may be the same format as customer traffic traversing the ECMP route. In such instances, the probe packet 108 may include an indicator for the endpoint node 104 to distinguish the probe packet 108 from the customer traffic and determine the probe packet 108 contains a TWAMP/PT probe.

In some examples, the source node 102 may send the probe packet 108 to the endpoint node 104 along the ECMP route. As such, the endpoint node 104 may receive the probe packet 108 via the ECMP route. In some examples, the endpoint node 104 may be configured to determine that the packet is a probe packet that is to be forwarded back to the source node 102. For instance, the endpoint node 104 may determine the packet is the probe packet 108 and/or that the probe packet 108 is to be forwarded back to the source node 102 based at least in part on an indication included in the probe packet 108.

In some examples, the endpoint node 104 may modify a hop-by-hop option type of the probe packet 108 to refrain from collecting telemetry data along a return path to the source node 102. For instance, when the probe packet 108 is received at the endpoint node 104, the probe packet 108 may include telemetry data appended to the probe packet 108 by the one or more midpoint nodes 106 along the ECMP route. As such, the endpoint node 104 may modify the hop-by-hop option so that midpoint nodes along the return path do not append additional telemetry data in the probe packet 108. For instance, the endpoint node 104 may change the hop-by-hop option type from "PT" for path tracing to "PT-SKIP" so that no more telemetry data is collected. In some examples, the telemetry data may be carried within a hop-by-hop (HBH) field of the probe packet 108. In examples, the telemetry data may be midpoint compressed data, which may include a short timestamp, short interface identifier, interface load, etc. associated with one or more midpoint nodes 106.

In some examples, the endpoint node 104 may append its own telemetry data to the probe packet 108. That is, the endpoint node 104 may add telemetry data to the hop-by-hop field of the probe packet 108. This telemetry data added by the endpoint node 104 may include timestamp data, interface identifier data, interface load data, midpoint compressed data, and/or the like for determining combined latency, loss, and liveness. For instance, the telemetry data may include a portion of a timestamp, an interface identifier, and an interface load associated with the endpoint node 104.

In some examples, the endpoint node 104 may loopback 114 or otherwise send the probe packet 108 back to the source node 102 and the source node 102 may subsequently receive the probe packet 108. The received probe packet 108 may, in some examples, include telemetry data associated with the endpoint node 104 and the one or more midpoint nodes 106 of the ECMP route. In some examples, the telemetry data may be included in a hop-by-hop field of the probe packet 108. In some examples, the telemetry data may include a portion of a timestamp (e.g., short, 8-bit timestamp), an interface identifier (e.g., short, 12-bit interface identifier), and an interface load associated with each one of the endpoint node 104 and the one or more midpoint nodes 106.

In some examples, the source node 102 may determine, based at least in part on the telemetry data, metric(s) 112 indicative of a performance measurement associated with the ECMP route. In some examples, the performance measurement may include a latency, a loss, or a liveness associated with the ECMP route. In some examples, the ECMP route may be a first ECMP route and the metric may be determined based at least in part on additional telemetry data received from sending a second TWAMP probe along a second ECMP route. In such instances, the metric(s) 112 may be indicative of a difference in performance between the first ECMP route and the second ECMP route. For instance, the metric(s) 112 may include a histogram associated with the first ECMP route, the second ECMP route, and other ECMP routes. In some examples, the histogram may be a latency histogram. In some examples, the metric(s) 112 may be a packet loss metric, an availability metric, a combined latency, loss, and liveness (3 L) metric, etc.

In some examples, the source node 102 may send the metric(s) 112 and/or other performance measurement/tracing data to a measurement analytics system 114 associated with the network. For instance, the latency histogram and any other metric(s) 112 indicative of the performance of the ECMP route relative to other ECMP route(s) may be sent to the measurement analytics (MA) system 114. In some examples, the MA system 114 may have a view of the complete network topology and all ECMP routes between any two nodes in the network. Additionally, the MA system 114 may indicate unexpected latency issue with an ECMP path between the source and endpoint nodes based on histogram with latency value distribution. In examples, the MA system 114 may compute availability of a given ECMP path based on liveness state information over time. Further, in some examples, the MA system 114 may display the graph of only intelligent data (that may require operator attention and highlight issues) from the raw data collected by the probes using the network routing and topology information it has. The MA system 114 may find common hop between multiple ECMP paths with packet loss to help find issues in the network by correlating multiple issues. In some examples, the controller 110 may create sessions & bins 116 for the source node 102.

Figure 2:
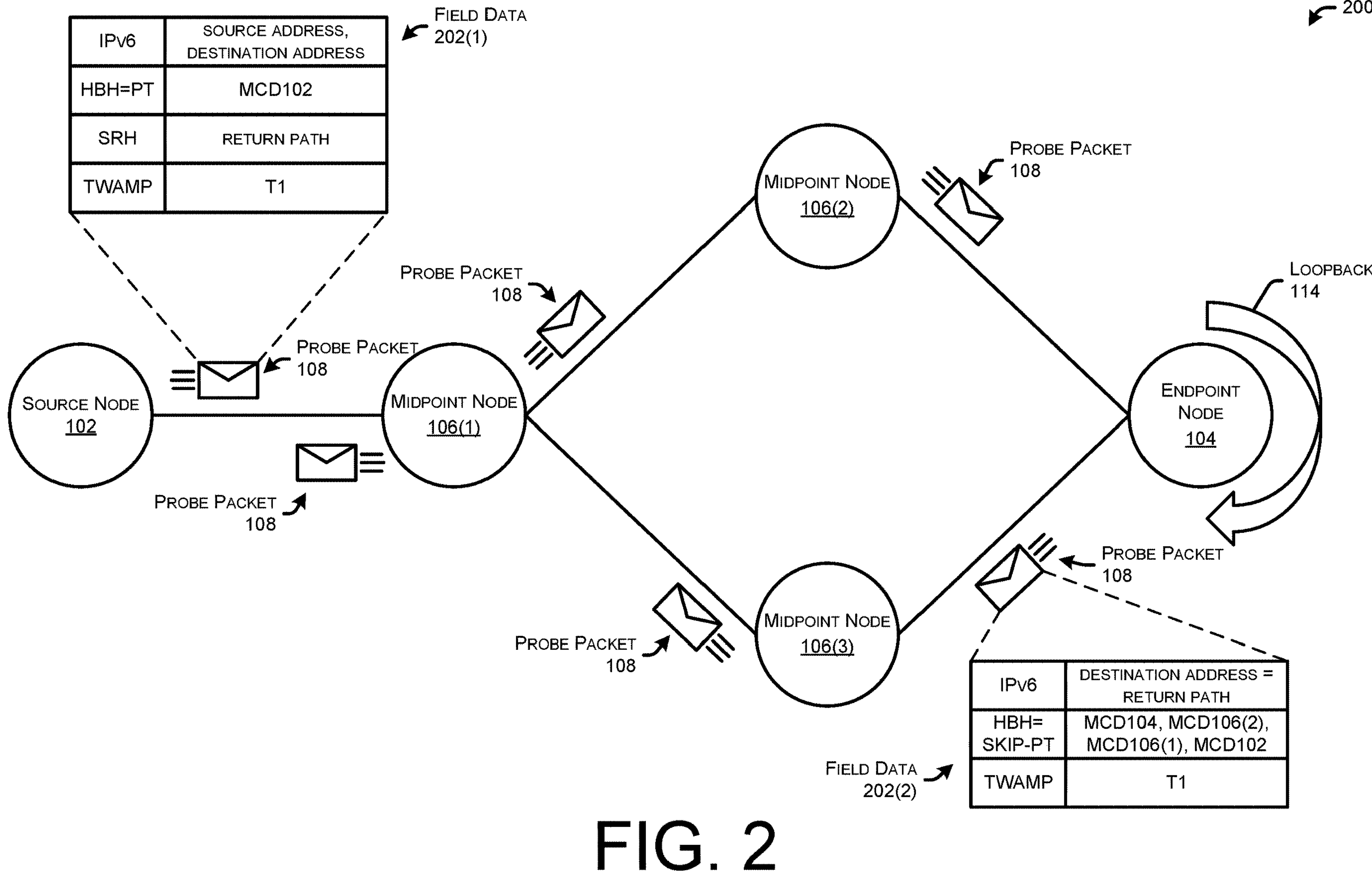
FIG. 2 illustrates an example architecture and a loopback probe message traversing the example architecture in accordance with the techniques described herein.

FIG. 2 illustrates an example architecture 200 and a loopback probe packet 108 traversing the example architecture 200 in accordance with the techniques described herein. As shown in FIG. 2, the probe packet 108 may be sent from the source node 102 to the endpoint node 104 via a first path (e.g., an ECMP path) and returned from the endpoint node 104 to the source node 102 via a second, different path. For example, the forward path of the probe packet 108 is from the source node 102, to the midpoint node 106(1), to the midpoint node 106(2), and then to the endpoint node. However, the reverse path of the probe packet 108 is from the endpoint node 104, to the midpoint node 106(3), to the midpoint node 106(1), and then to the source node 102. The reverse path may be IPv4 or IPv6 path, segment routing path, MPLS path, SR-MPLS path, SRv6 path or traffic engineering path. The reverse path may follow the same ECMP path as the forward direction path of the probe or different path.

In examples, the probe packet 108 may include various field data for routing the packet, collecting telemetry data, and the like. For instance, when the probe packet 108 is first sent from the source node 102 to the midpoint node 106(1), the probe packet 108 may include the field data 202(1). In examples, the field data 202(1) may comprise an IPv6 header that includes the source address and the destination address, a hop-by-hop field for carrying midpoint compressed data (such as the midpoint compressed data updated by the source node 102 "MCD102"), a segment routing header (SRH) that includes the return path for sending the probe packet 108 back to the source node 102, and the TWAMP probe that includes a timestamp "Ti."

As the probe packet 108 traverses the path from the source node 102 to the endpoint node 104, the midpoint nodes 106(1) and 106(2) may update the probe packet 108 with their own midpoint compressed data. For example, the probe packet 108 that is returned from the endpoint node 104 to the source node 102 (e.g., the probe packet that is in between the endpoint node 104 and the midpoint node 106(3) in FIG. 2), includes midpoint compressed data from the source node 102 (e.g., "MCD102"), the midpoint node 106(1) (e.g., "MCD106(1)"), the midpoint node 106(2) (e.g., "MCD106(2)"), and the endpoint node 104 (e.g., "MCD104"). In examples, this midpoint compressed data may include, for each node, a short timestamp, an interface identifier, and an interface load.

In examples, when the endpoint node 104 receives the probe packet 108, it may determine that the probe packet 108 is to be send back to the source node 102 and loopback 114 the packet. In some examples, the field data 202(2) of the probe packet 108 may be updated by the endpoint node 104. For instance, the IPv6 header may be updated such that the destination address corresponds with the return path that was specified in the SRH (included in the field data 202(1)). This allows the probe packet 108 to be sent back to the source node 102. Additionally, the endpoint node 104 may update the HBH option type to "PT-SKIP" option type or destination option type so that the various nodes along the reverse path will refrain from updating their own midpoint compressed data in the probe packet 108.

Figure 3:
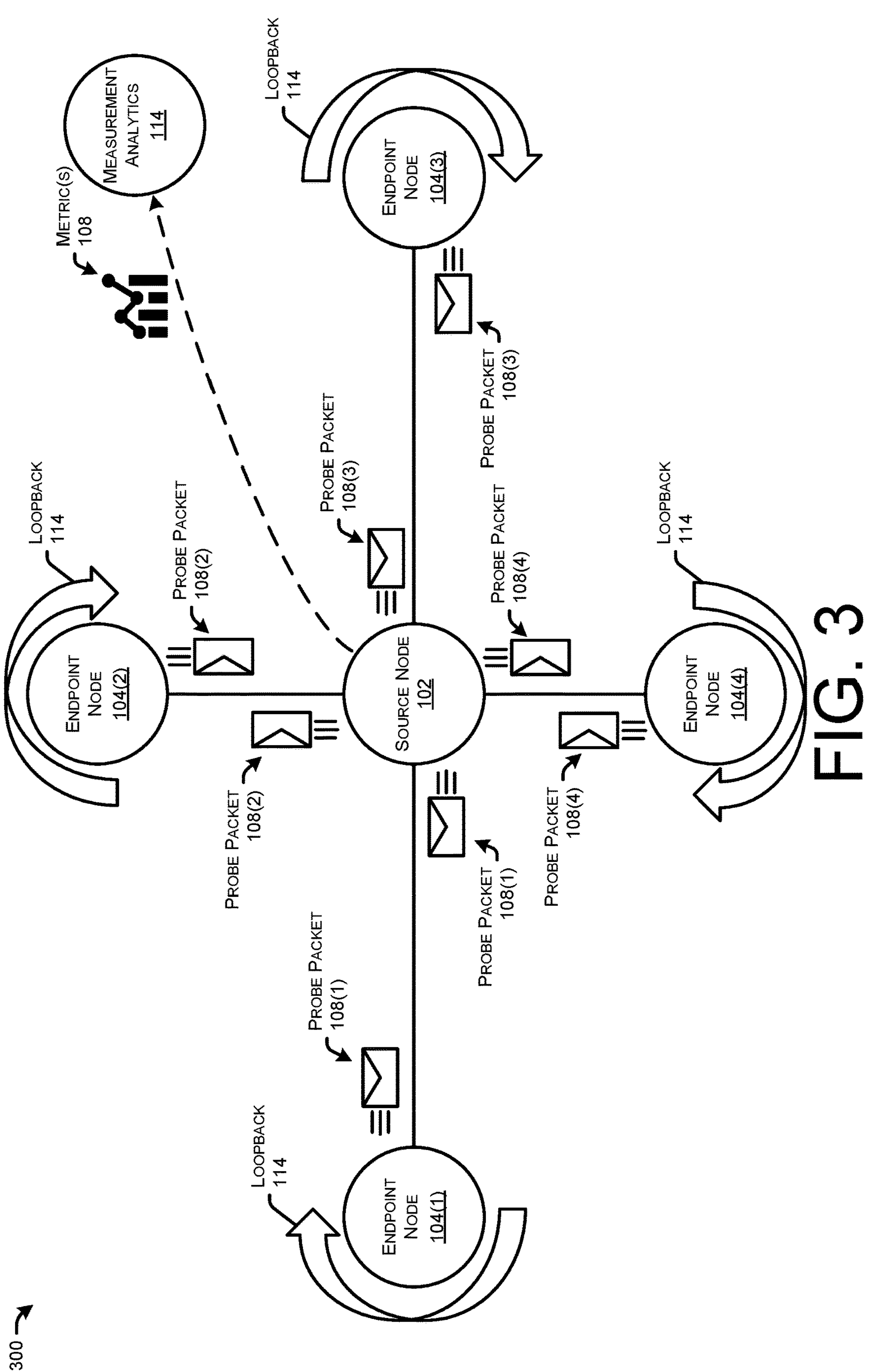
FIG. 3 is a system diagram illustrating another example architecture which may utilize various aspects of the techniques disclosed herein.

FIG. 3 is a system diagram illustrating another example architecture 300 which may utilize various aspects of the techniques disclosed herein. In the architecture 300, a source node 102 is sending probe packets 112(1)-112(4) to different endpoint nodes 104(1)-104(4) in accordance with the techniques disclosed herein. The endpoint nodes 104(1)-104(4), upon receiving the probe packets 112(1)-112(4), may decapsulate the packets, perform various operations (e.g., update midpoint compressed data, change HBH option type, etc.), and loopback 114 the probe packets 112(1)-112(4) to the source node 102. In some examples, the source node 102 may compute various metric(s) 112 based on the probe packets 112(1)-112(4) and then provide these metric(s) 112 to the measurement analytics system 114.

Figure 4:
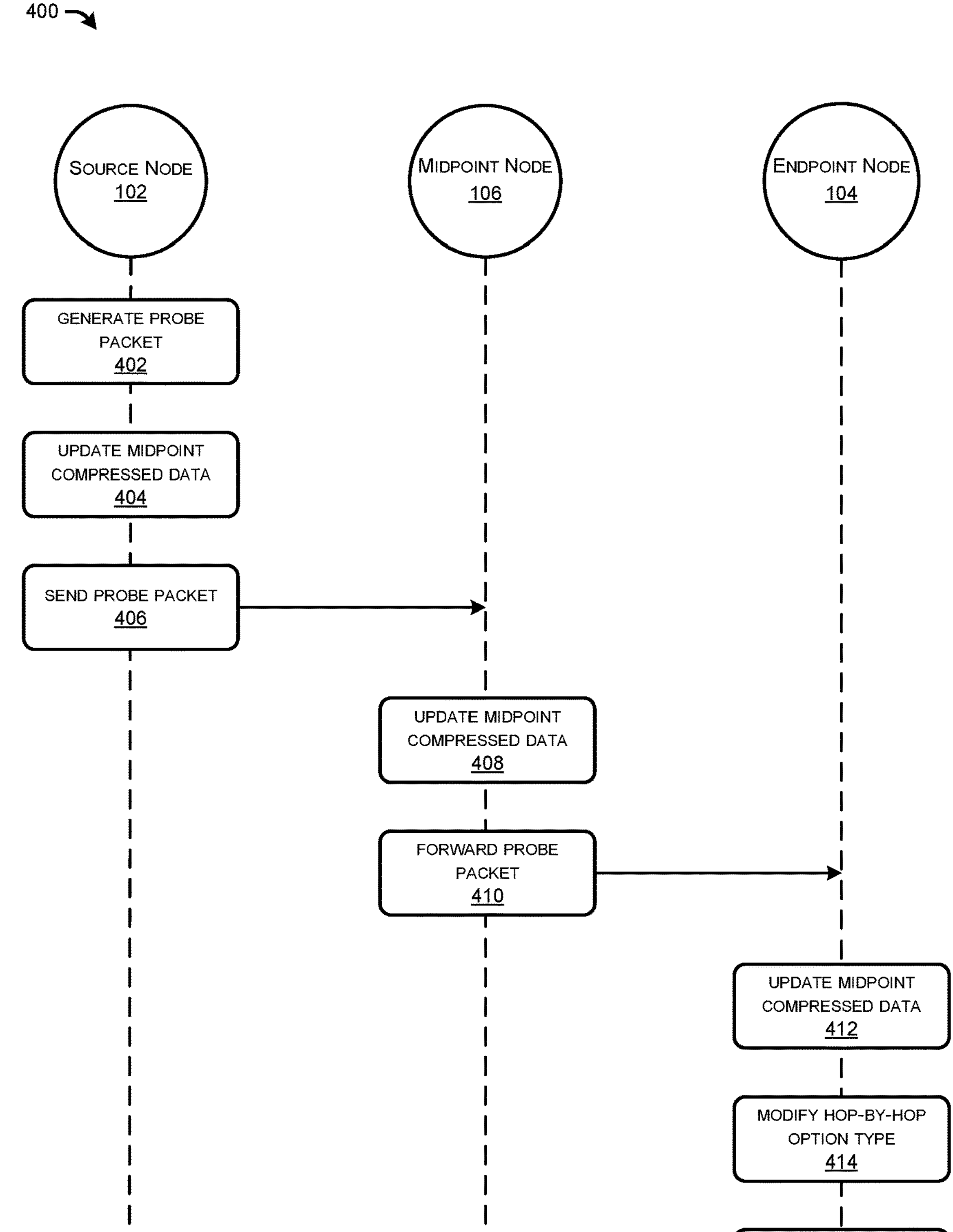
FIG. 4 is a pictorial flow diagram illustrating an example process associated with the techniques disclosed herein.

FIG. 4 is a pictorial flow diagram illustrating an example process 400 associated with the techniques disclosed herein. The process 400 illustrates various operations performed by a source node 102, midpoint node 106, and endpoint node 104 in accordance with the technique disclosed herein.

At operation 402, the process 400 includes generating a probe packet. For instance, the source node 102 may generate a TWAMP probe packet that includes a PT IPv6 HPH option for path tracing. At operation 404, the process 400 includes the source node 102 updating midpoint compressed data. For instance, the source node 102 may update the HPH field of the probe packet to include the midpoint compressed data, which may include a short timestamp, interface identifier, and interface load, in some instances. At operation 406, the source node 102 may send the probe packet to the midpoint node 106. In some examples, the midpoint node may be a midpoint node associated with an ECMP path between the source node 102 and the destination node 104. In some examples, an ECMP path may include multiple midpoint nodes.

At operation 408, after receiving the probe packet, the midpoint node 106 may update the midpoint compressed data in the probe packet. For instance, the midpoint node 106 may update the HPH field of the probe packet to include the midpoint compressed data, which may include a short timestamp, interface identifier, and interface load, in some instances. In some instances, the midpoint compressed data may be associated with either an ingress interface or egress interface of the midpoint node. As an example, the short timestamp may correspond with a time at which the midpoint node 106 received the probe packet or, conversely, correspond with the time at which the midpoint node 106 send the probe packet. Similarly, the interface identifier and interface load may correspond with an ingress interface or egress interface. At operation 410, the midpoint node 106 may forward the probe packet. As shown in FIG. 4, the midpoint node 106 forwards the probe packet to the endpoint node 104. However, in some examples, the midpoint node 106 may forward the probe packet to other midpoint nodes between itself and the endpoint node 104.

At operation 412, the endpoint node 104, after receiving the probe packet, may update the midpoint compressed data. For instance, the endpoint node 104 may update the HPH field of the probe packet to include the midpoint compressed data, which may include a short timestamp, interface identifier, and interface load, in some instances. At operation 414, the endpoint node 104 may modify a hop-by-hop (HBH) option type of the packet. For instance, the endpoint node 104 may change the HBH option type to "PT-SKIP" so that nodes on the reverse path refrain from updating, and possibly overwriting, the midpoint compressed data being carried in the probe packet. At operation 416, the endpoint node 104 may return the probe packet to the source node 102, which is also serving as the sink node in the loopback probe instances described herein. That is, the source node 102 may also be a sink node and configured to calculate metrics based on the data collected in the probe packet.

Figure 6:
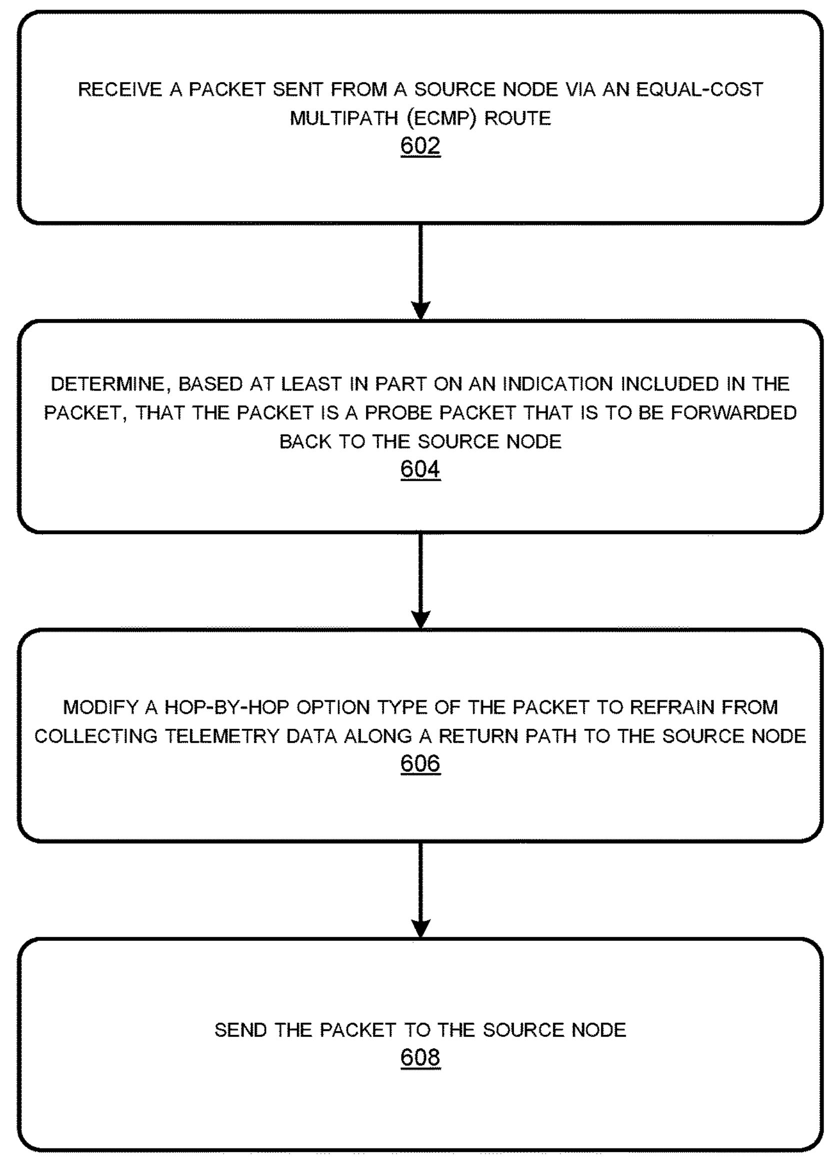
FIG. 6 is a flow diagram illustrating another example method associated with the techniques disclosed herein.

FIGS. 5 and 6 are flow diagrams illustrating example methods 500 and 600 associated with the techniques disclosed herein. The logical operations described herein with respect to FIGS. 5 and 6 may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

It should also be appreciated that more or fewer operations might be performed than shown in FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The exemplary method 500 shown in FIG. 5 illustrates various operations that may be performed by a source node in accordance with the techniques disclosed herein. The method 500 begins at operation 502, which includes determining that a TWAMP probe is to be sent from a first node to a second node along an ECMP route between the first node and the second node. For instance, the source node 102 may determine that the TWAMP probe is to be sent from the first node (e.g., source node 102) to a second node (e.g., endpoint node 104) along an ECMP route between the first node and the second node.

At operation 504, the method 500 includes generating a packet for sending the TWAMP probe to the second node along the ECMP route, the packet including first address information associated with the ECMP route and second address information for the packet to be returned to the first node from the second node. For instance, the source node 102 may generate the probe packet 108 for sending the TWAMP probe to the second node (e.g., endpoint node 104) along the ECMP route. In examples, the source node may include in the probe packet first address information associated with the ECMP route (e.g., forward path information specifying the forward path/ECMP route) and second address information specifying the reverse path to be used for sending the probe packet back to the source node.

At operation 506, the method 500 includes sending the packet to the second node along the ECMP route. For instance, the source node 102 may send the packet to the endpoint node 104 along the ECMP route.

At operation 508, the method 500 includes receiving, from the second node, the packet including telemetry data associated with the second node and a midpoint node of the ECMP route. For instance, the source node 102 may receive the probe packet 108 from the second node (e.g., endpoint node 104). In examples, the probe packet 108 may include the telemetry data (e.g., midpoint compressed data) associated with the endpoint node 104 and the midpoint node 106. For instance, each node associated with each hop may update the probe packet with its own midpoint compressed data.

At operation 510, the method 500 includes determining, based at least in part on the telemetry data, a metric indicative of a performance measurement associated with the ECMP route. For instance, the source node 102 may determine the metric indicative of the performance measurement associated with the ECMP route based on the telemetry data included in the probe packet 108. In some examples, the metric may represent a performance of the ECMP route with respect to other ECMP routes between the first node and the second node. In some examples, the metric may indicate a combined latency, loss, and liveness associated with the ECMP route.

The exemplary method 600 shown in FIG. 6 illustrates various operations that may be performed by an endpoint node 104 in accordance with the techniques disclosed herein. The method 600 begins at operation 602, which includes receiving a packet sent from a source node via an ECMP route. For instance, the endpoint node 104 may receive the probe packet 108 send from the source node 102 via the ECMP route.

At operation 604, the method 600 includes determining, based at least in part on an indication included in the packet, that the packet is a probe packet that is to be forwarded back to the source node. For instance, the endpoint node 104 may determine that the packet is the probe packet 108 that is to be forwarded back to the source node 102. In examples, the endpoint node 104 may determine that the packet is a TWAMP probe packet including a PT IPv6 HPH option for path tracing. In examples, the endpoint node 104 may determine the packet is to be sent to the source node 102 based on an indication included in the packet. In examples, the indication may be a destination address, segment identifier, or the like that is included in a segment routing header of the probe packet.

At operation 606, the method 600 includes modifying a hop-by-hop option type of the packet to refrain from collecting telemetry data along a return path to the source node. For instance, the endpoint node 104 may modify the HBH option type of the probe packet 108 from "PT" to "PT-SKIP" to refrain from collecting telemetry data along the return path. That is, modifying the HBH option type in this way may cause the midpoint nodes along the return path to refrain from updating the midpoint compressed data carried in the HBH field.

At operation 608, the method 600 includes sending the packet to the source node. For instance, once the endpoint node 104 has modified the packet, the endpoint node 104 may send the probe packet 108 back to the source node via the return path. In examples, the endpoint node 104 may send the probe packet to the source node via a default path. In other examples, the endpoint node 104 may send the probe packet to the source node via a specific path specified by the source node and indicated in a segment routing header of the packet.

Figure 7:
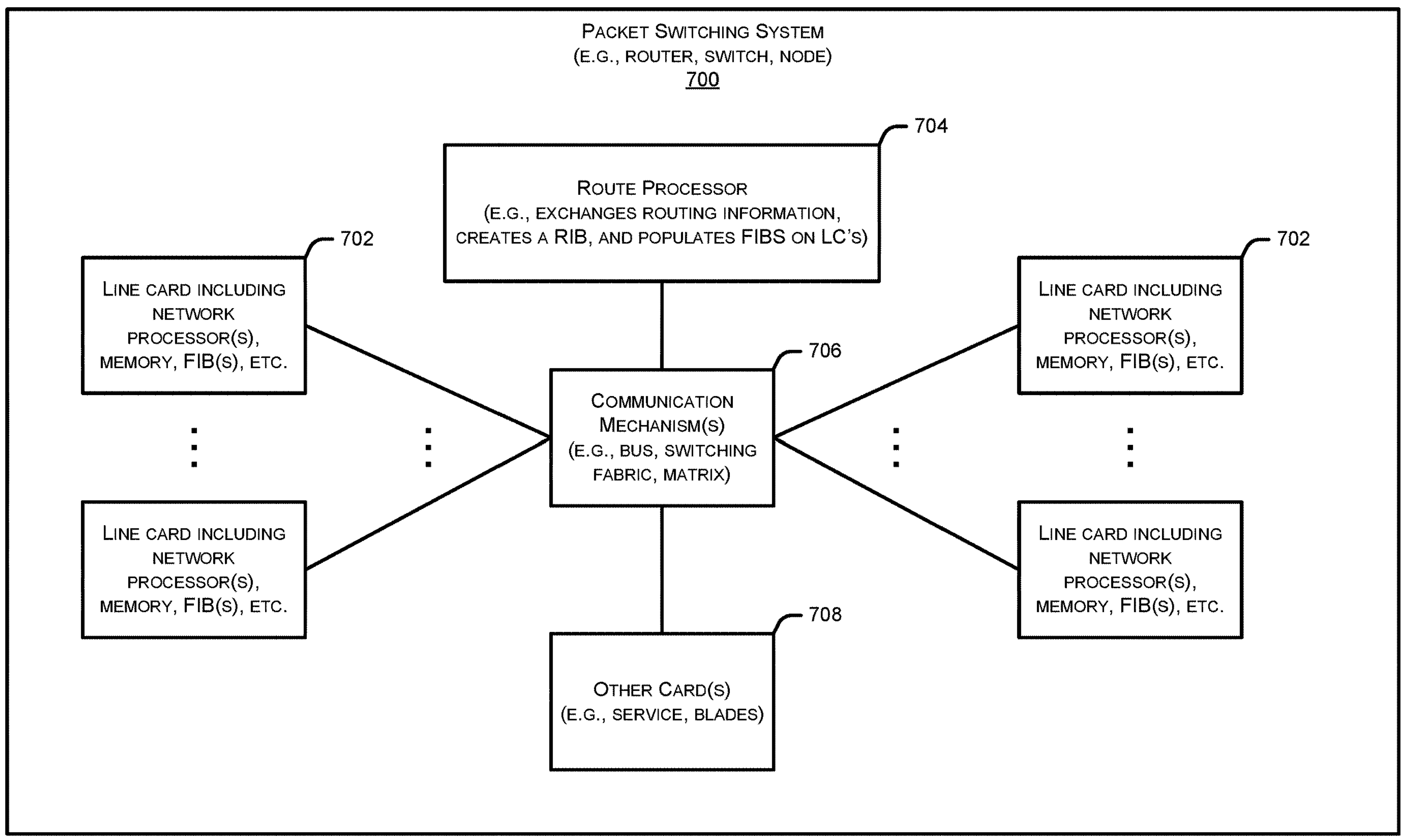
FIG. 7 is a block diagram illustrating an example packet switching system that can be utilized to implement various aspects of the technologies disclosed herein.

FIG. 7 is a block diagram illustrating an example packet switching device 700 (or packet switching system) that can be utilized to implement various aspects of the technologies disclosed herein. In some examples, packet switching device(s) 700 may be employed in various networks and architectures, such as, for example, the architecture 100 described with respect to FIG. 1. For instance, the source node 102, the endpoint node 104, and the midpoint nodes 106 may include similar components as the packet switching device 700.

In some examples, the packet switching device 700 may comprise multiple line card(s) 702, each with one or more network interfaces for sending and receiving packets over communications links (e.g., possibly part of a link aggregation group). The packet switching device 700 may also have a control plane with one or more route processor 704 elements for managing the control plane and/or control plane processing of packets associated with forwarding of packets in a network, including, but not limited to, exchanging routing information, creating routing information base(s) (RIBs), and/or populating forward information base(s) (FIBs) on LCs. The packet switching device 700 may also include other cards 708 (e.g., service cards, blades) which include processing elements that are used to process (e.g., forward/send, drop, manipulate, change, modify, receive, create, duplicate, apply a service) packets associated with forwarding of packets in a network. The packet switching device 700 may comprise hardware-based communication mechanism 706 (e.g., bus, switching fabric, and/or matrix, etc.) for allowing its different entities to communicate. Line card(s) 702 may typically perform the actions of being both an ingress and/or an egress line card 702 in regard to multiple other particular packets and/or packet streams being received by, or sent from, packet switching device 700.

Figure 8:
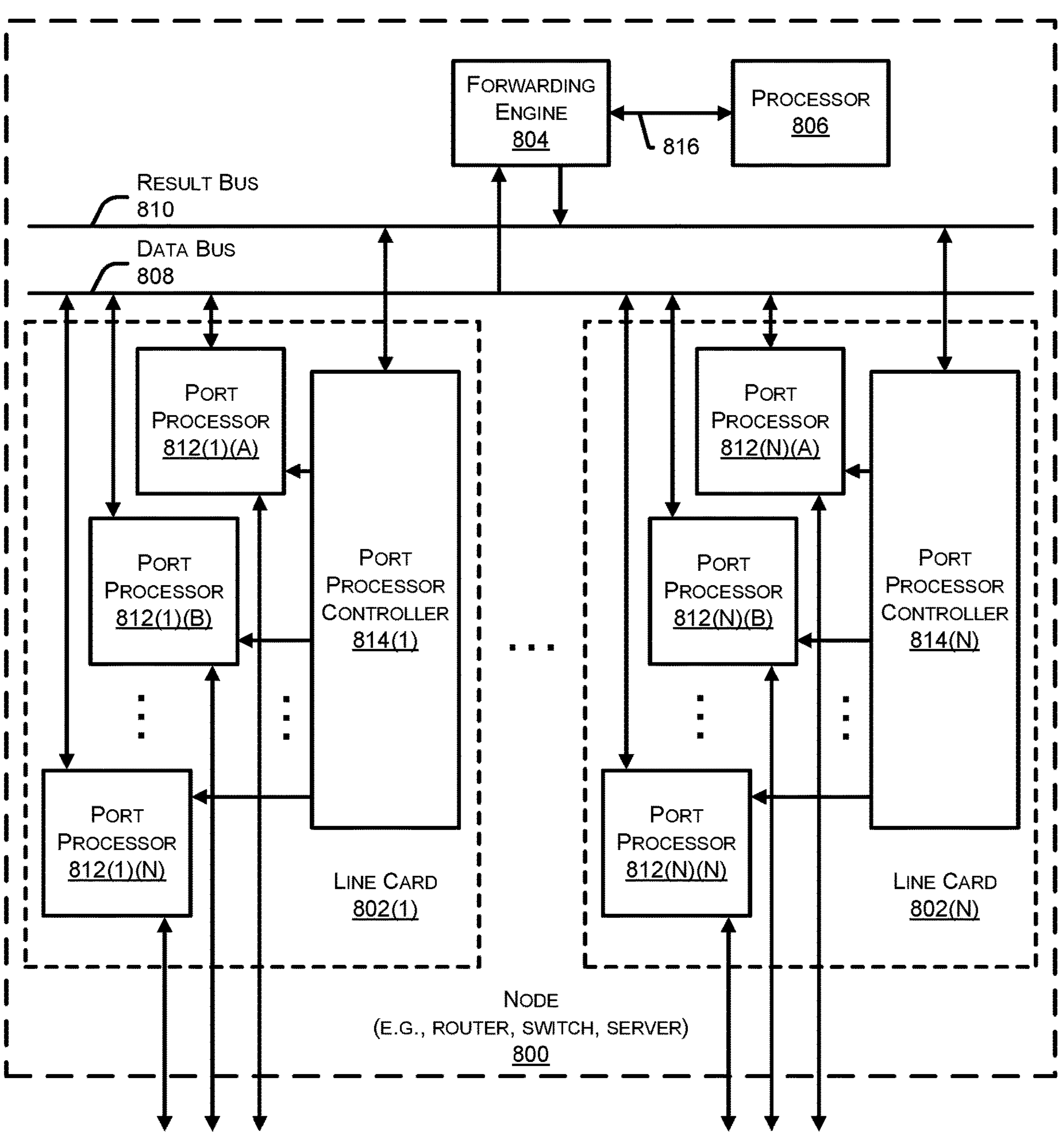
FIG. 8 is a block diagram illustrating certain components of an example node that can be utilized to implement various aspects of the technologies disclosed herein.

FIG. 8 is a block diagram illustrating certain components of an example node 800 that can be utilized to implement various aspects of the technologies disclosed herein. In some examples, node(s) 800 may be employed in various architectures and networks, such as, for example, the architecture 100 described with respect to FIG. 1. For instance, the source node 102, the endpoint node 104, and the midpoint nodes 106 may include similar components as the node 800.

In some examples, the node 800 may include any number of line cards 802 (e.g., line cards 802(1)-(N), where N may be any integer greater than 1) that are communicatively coupled to a forwarding engine 804 (also referred to as a packet forwarder) and/or a processor 806 via a data bus 808 and/or a result bus 810. Line cards 802(1)-(N) may include any number of port processors 812(1)(A)-(N)(N) which are controlled by port processor controllers 814(1)-(N), where N may be any integer greater than 1. Additionally, or alternatively, forwarding engine 804 and/or processor 806 are not only coupled to one another via the data bus 808 and the result bus 810, but may also communicatively coupled to one another by a communications link 816.

The processors (e.g., the port processor(s) 812 and/or the port processor controller(s) 814) of each line card 802 may be mounted on a single printed circuit board. When a packet or packet and header are received, the packet or packet and header may be identified and analyzed by node 800 (also referred to herein as a router) in the following manner. Upon receipt, a packet (or some or all of its control information) or packet and header may be sent from one of port processor(s) 812(1)(A)-(N)(N) at which the packet or packet and header was received and to one or more of those devices coupled to the data bus 808 (e.g., others of the port processor(s) 812(1)(A)-(N)(N), the forwarding engine 804 and/or the processor 806). Handling of the packet or packet and header may be determined, for example, by the forwarding engine 804. For example, the forwarding engine 804 may determine that the packet or packet and header should be forwarded to one or more of port processors 812(1)(A)-(N)(N). This may be accomplished by indicating to corresponding one(s) of port processor controllers 814(1)-(N) that the copy of the packet or packet and header held in the given one(s) of port processor(s) 812(1)(A)-(N)(N) should be forwarded to the appropriate one of port processor(s) 812(1)(A)-(N)(N). Additionally, or alternatively, once a packet or packet and header has been identified for processing, the forwarding engine 804, the processor 806, and/or the like may be used to process the packet or packet and header in some manner and/or maty add packet security information in order to secure the packet. On a node 800 sourcing such a packet or packet and header, this processing may include, for example, encryption of some or all of the packet's and/or header's information, the addition of a digital signature, and/or some other information and/or processing capable of securing the packet or packet and header. On a node 800 receiving such a processed packet or packet and header, the corresponding process may be performed to recover or validate the packet's and/or header's information that has been secured.

Figure 9:
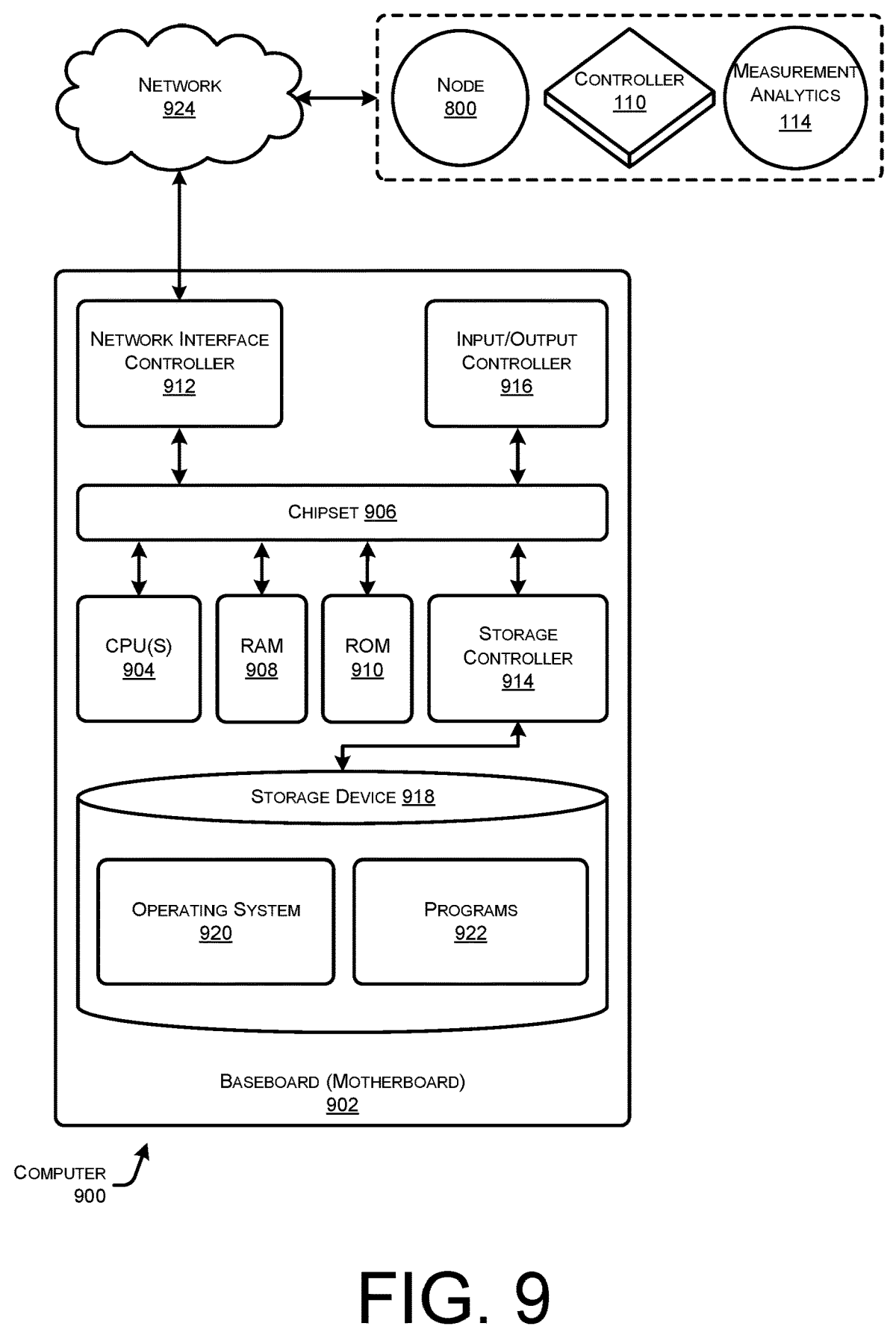

FIG. 9 is a computer architecture diagram showing an illustrative computer hardware architecture for implementing a computing device that can be utilized to implement aspects of the various technologies presented herein. The computer architecture shown in FIG. 9 may be illustrative of a conventional server computer, router, switch, workstation, desktop computer, laptop, tablet, network appliance, e-reader, smartphone, load balancer, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network. The chipset 906 can include functionality for providing network connectivity through a NIC 912, such as a gigabit Ethernet adapter. The NIC 912 is capable of connecting the computer 900 to other computing devices over the network 924, such as the node 800 (e.g., which may represent any one of the source node 102, the endpoint node 104, or the midpoint nodes 106), the controller 110, or the measurement analytics system 114. It should be appreciated that multiple NICs 912 can be present in the computer 900, connecting the computer to other types of networks and remote computer systems. In some examples, the NIC 912 may be configured to perform at least some of the techniques described herein.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the architectures 100, 200, and 300 and or any components included therein, may be supported by one or more devices similar to computer 900. Stated otherwise, some or all of the operations performed by the architectures 100, 200, and 300 and or any components included therein, may be performed by one or more computer devices, which may be similar to the computer 900, operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes and functionality described above with regard to FIGS. 1-8, and herein. The computer 900 can also include computer readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

The computer 900 may include one or more hardware processors (processors) configured to execute one or more stored instructions. The processor(s) may comprise one or more cores. Further, the computer 900 may include one or more network interfaces configured to provide communications between the computer 900 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure for generating and utilizing TWAMP loopback probes along with Path Tracing (PT) Internet Protocol version 6 (IPv6) hop-by-hop (HBH) option to determine latency, loss, and liveness (3 L) performance metrics. For instance, the programs 922 may be configured to generate TWAMP loopback probes that include PT IPv6 HBH options, as well as configured to determine latency, loss, and liveness (3 L) performance metrics.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partially by a first node of a network, the method comprising:

determining that a Two-Way Active Measurement Protocol (TWAMP) probe is to be sent to a second node along an equal-cost multipath (ECMP) route between the first node and the second node;

generating a packet for sending the TWAMP probe to the second node along the ECMP route, the packet including first address information associated with the ECMP route and second address information for the packet to be returned to the first node from the second node, the packet further comprising:

a transmit timestamp indicating a time at which the packet is transmitted; and a hop-by-hop option field configured to record Midpoint Compressed Data (MCD) at a midpoint node along the ECMP route;

sending the packet to the second node along the ECMP route;

receiving, from the second node and at the first node, the packet including telemetry data associated with the second node and the midpoint node of the ECMP route;

identifying, at the first node and from the hop-by-hop option field, a portion of the telemetry data representing a performance measurement associated with the midpoint node, the hop-by-hop option field being populated with the portion of the telemetry data by the midpoint node; and determining, at the first node and based at least in part on the telemetry data, a metric indicative of the performance measurement associated with the midpoint node.

2. The method of claim 1, wherein the performance measurement comprises at least one of a latency, a loss, or a liveness associated with the ECMP route.

3. The method of claim 1, wherein the telemetry data is included in a hop-by-hop field of the packet, the telemetry data including a portion of a timestamp, an interface identifier, and an interface load associated with each one of the second node and the midpoint node.

4. The method of claim 1, further comprising sending the metric to a measurement analytics system associated with the network, the metric comprising a histogram indicative of a performance associated with the ECMP route relative to another ECMP route through the network.

5. The method of claim 1, wherein the ECMP route is a first ECMP route and the metric is determined based at least in part on additional telemetry data received from sending a second TWAMP probe along a second ECMP route, the metric indicative of a difference in performance between the first ECMP route and the second ECMP route.

6. The method of claim 1, wherein the ECMP route is one of multiple ECMP routes through the network between the first node and the second node.

7. The method of claim 1, wherein the telemetry data is associated with a forwarding path of the packet along the ECMP route between the first node and the second node, the second node configured to modify a hop-by-hop option type of the packet to prevent collection of telemetry data associated with a return path from the second node to the first node.

8. The method of claim 1, wherein a format of the packet is a same format as customer traffic traversing the ECMP route, the packet further including an indicator for the second node to distinguish the packet from the customer traffic.

9. A system associated with a first node of a network, the system comprising:

one or more processors; and one or more non-transitory computer-readable media storing instructions that, when executed, cause the one or more processors to perform operations comprising:

determining that a Two-Way Active Measurement Protocol (TWAMP) probe is to be sent to a second node along an equal-cost multipath (ECMP) route between the first node and the second node;

generating a packet for sending the TWAMP probe to the second node along the ECMP route, the packet including first address information associated with the ECMP route and second address information for the packet to be returned to the first node from the second node, the packet further comprising:

a transmit timestamp indicating a time at which the packet is transmitted; and a hop-by-hop option field configured to record Midpoint Compressed Data (MCD) at a midpoint node along the ECMP route;

sending the packet to the second node along the ECMP route;

receiving, from the second node and at the first node, the packet including telemetry data associated with the second node and the midpoint node of the ECMP route;

identifying, at the first node and from the hop-by-hop option field, a portion of the telemetry data representing a performance measurement associated with the midpoint node, the hop-by-hop option field being populated with the portion of the telemetry data by the midpoint node; and determining, at the first node and based at least in part on the telemetry data, a metric indicative of the performance measurement associated with the midpoint node.

10. The system of claim 9, wherein the performance measurement comprises at least one of a latency, a loss, or a liveness associated with the ECMP route.

11. The system of claim 9, wherein the telemetry data is included in a hop-by-hop field of the packet, the telemetry data including a portion of a timestamp, an interface identifier, and an interface load associated with each one of the second node and the midpoint node.

12. The system of claim 9, the operations further comprising sending the metric to a measurement analytics system associated with the network, the metric comprising a histogram indicative of a performance associated with the ECMP route relative to another ECMP route through the network.

13. The system of claim 9, wherein the ECMP route is a first ECMP route and the metric is determined based at least in part on additional telemetry data received from sending a second TWAMP probe along a second ECMP route, the metric indicative of a difference in performance between the first ECMP route and the second ECMP route.

14. The system of claim 9, wherein the ECMP route is one of multiple ECMP routes through the network between the first node and the second node.

15. The system of claim 9, wherein the telemetry data is associated with a forwarding path of the packet along the ECMP route between the first node and the second node, the second node configured to modify a hop-by-hop option type of the packet to prevent collection of telemetry data associated with a return path from the second node to the first node.

16. The system of claim 9, wherein a format of the packet is a same format as customer traffic traversing the ECMP route, the packet further including an indicator for the second node to distinguish the packet from the customer traffic.

17. One or more non-transitory computer-readable media storing instructions that, when executed, cause one or more processors associated with a first node of a network to perform operations comprising:

determining that a Two-Way Active Measurement Protocol (TWAMP) probe is to be sent to a second node along an equal-cost multipath (ECMP) route between the first node and the second node;

generating a packet for sending the TWAMP probe to the second node along the ECMP route, the packet including first address information associated with the ECMP route and second address information for the packet to be returned to the first node from the second node the packet further comprising:

a transmit timestamp indicating a time at which the packet is transmitted; and a hop-by-hop option field configured to record Midpoint Compressed Data (MCD) at a midpoint node along the ECMP route;

sending the packet to the second node along the ECMP route;

receiving, from the second node and at the first node, the packet including telemetry data associated with the second node and the midpoint node of the ECMP route;

identifying, at the first node and from the hop-by-hop option field, a portion of the telemetry data representing a performance measurement associated with the midpoint node, the hop-by-hop option field being populated with the portion of the telemetry data by the midpoint node; and determining, at the first node and based at least in part on the telemetry data, a metric indicative of the performance measurement associated with the midpoint node.

18. The one or more non-transitory computer-readable media of claim 17, wherein the performance measurement comprises at least one of a latency, a loss, or a liveness associated with the ECMP route.

19. The one or more non-transitory computer-readable media of claim 17, wherein the telemetry data is included in a hop-by-hop field of the packet, the telemetry data including a portion of a timestamp, an interface identifier, and an interface load associated with each one of the second node and the midpoint node.

20. The one or more non-transitory computer-readable media of claim 17, the operations further comprising sending the metric to a measurement analytics system associated with the network, the metric comprising a histogram indicative of a performance associated with the ECMP route relative to another ECMP route through the network.

* * * * *